United States Patent
Zhang et al.

(10) Patent No.: US 8,014,280 B2
(45) Date of Patent: Sep. 6, 2011

(54) ADMISSION CONTROL BASED ON QOS PERFORMANCE IN A WIRELESS COMMUNICATION NETWORK

(75) Inventors: Danlu Zhang, San Diego, CA (US); Naga Bhushan, San Diego, CA (US); Rajesh Kumar Pankaj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 98 days.

(21) Appl. No.: 12/190,696

(22) Filed: Aug. 13, 2008

(65) Prior Publication Data

US 2009/0086629 A1    Apr. 2, 2009

Related U.S. Application Data

(60) Provisional application No. 60/975,869, filed on Sep. 28, 2007.

(51) Int. Cl.
*H04W 28/08* (2009.01)
*H04W 28/12* (2009.01)
*H04W 28/16* (2009.01)
*H04L 12/26* (2006.01)
*G08C 17/02* (2006.01)

(52) U.S. Cl. .............. 370/230; 370/235; 455/452.2

(58) Field of Classification Search .......... 370/230, 370/230.1, 232, 234, 235; 455/423, 450, 455/452.1, 452.2, 453
See application file for complete search history.

(56) References Cited

U.S. PATENT DOCUMENTS

| | | | |
|---|---|---|---|
| 7,385,920 B2 | 6/2008 | Zhang et al. | |
| 7,474,627 B2* | 1/2009 | Chheda et al. | 370/252 |
| 7,725,122 B1* | 5/2010 | Balakrishnan et al. | 455/522 |
| 2003/0031130 A1* | 2/2003 | Vanghi | 370/235 |
| 2003/0123392 A1* | 7/2003 | Ruutu et al. | 370/235 |
| 2003/0133415 A1* | 7/2003 | Kim et al. | 370/235 |
| 2004/0013089 A1* | 1/2004 | Taneja et al. | 370/235 |

(Continued)

FOREIGN PATENT DOCUMENTS

WO    WO2004064433    7/2004

(Continued)

OTHER PUBLICATIONS

International Search Report and the Written Opinion—PCT/US2008/077893, International Search Authority—European Patent Office—Apr. 9, 2009.

*Primary Examiner* — Chi H Pham
*Assistant Examiner* — Ahmed Elallam
(74) *Attorney, Agent, or Firm* — D. Scott Juneau

(57) ABSTRACT

Techniques for performing admission control based on quality-of-service (QoS) performance in a wireless communication network are described. QoS performance (e.g., delay or throughput performance) of admitted data flows may be determined. Whether to admit or reject a new data flow may then be determined based on the QoS performance of the admitted data flows. The admitted and new data flows may have delay bounds. The QoS performance of the admitted data flows may be given by a measured sector delay, which may be determined based on actual delays of packets. A measured flow delay for each admitted data flow may be determined based on delays of packets for that flow. The measured sector delay may then be determined based on the measured flow delays for all admitted data flows. The new data flow may be admitted if the measured sector delay is less than a delay threshold.

27 Claims, 7 Drawing Sheets

U.S. PATENT DOCUMENTS

| | | | |
|---|---|---|---|
| 2004/0228286 A1* | 11/2004 | Kim et al. | 370/252 |
| 2006/0133346 A1* | 6/2006 | Chheda et al. | 370/352 |
| 2006/0146721 A1 | 7/2006 | Attar et al. | |
| 2006/0215559 A1* | 9/2006 | Mese et al. | 370/232 |
| 2006/0252429 A1* | 11/2006 | Chen et al. | 455/450 |
| 2007/0091801 A1* | 4/2007 | Shahidi et al. | 370/230 |
| 2008/0004031 A1* | 1/2008 | Rong et al. | 455/452.1 |
| 2008/0137535 A1* | 6/2008 | Zhang et al. | 370/234 |
| 2009/0054072 A1* | 2/2009 | Chen et al. | 455/450 |

FOREIGN PATENT DOCUMENTS

| | | |
|---|---|---|
| WO | WO2008101223 | 8/2008 |

* cited by examiner

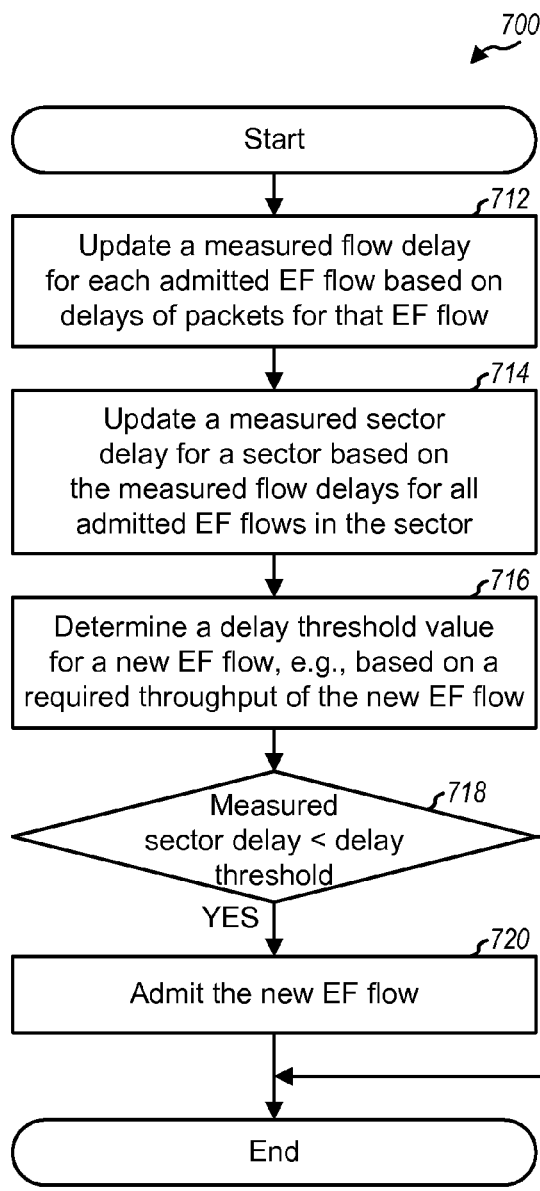
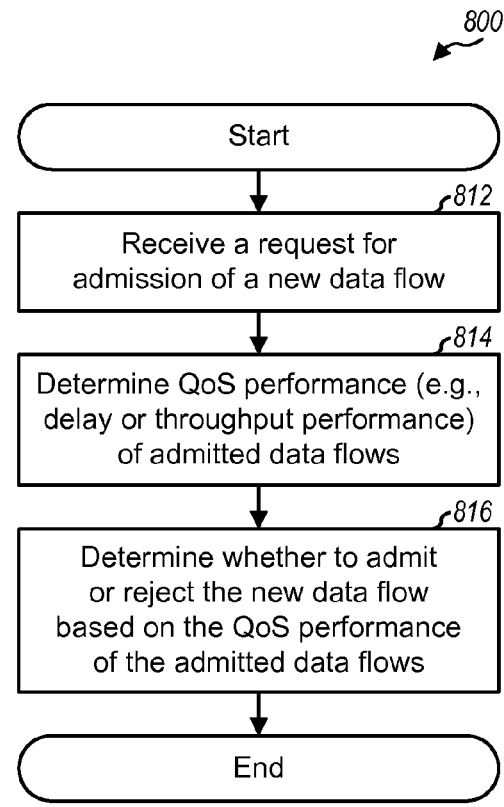
FIG. 7
FIG. 8

US 8,014,280 B2

ADMISSION CONTROL BASED ON QOS PERFORMANCE IN A WIRELESS COMMUNICATION NETWORK

CLAIM OF PRIORITY UNDER 35 U.S.C. §119

The present Application for Patent claims priority to Provisional U.S. Application Ser. No. 60/975,869, entitled "QoS Performance Based Admission Control in Cellular Networks," filed Sep. 28, 2007, assigned to the assignee hereof, and expressly incorporated herein by reference.

BACKGROUND

I. Field

The present disclosure relates generally to communication, and more specifically to techniques for performing admission control in a wireless communication network.

II. Background

Wireless communication networks are widely deployed to provide various communication services such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In a wireless communication network, a base station may communicate with multiple terminals on the forward and reverse links. A limited amount of network resources may be available for each link to support transmission of all data flows on that link. The data flows may have quality-of-service (QoS) requirements such as delay bound, average throughput, etc. It is desirable to admit as many data flows as possible on each link while providing satisfactory performance for all or many of the admitted data flows. Admitting too many data flows may result in insufficient network resources being available to provide satisfactory performance for the admitted data flows. Conversely, admitting too few data flows may result in under-utilization of the available network resources. Admitting too many or too few data flows has undesirable results.

SUMMARY

Techniques for performing admission control based on QoS performance in a wireless communication network are described herein. In one design, a request for admission of a new data flow may be received. QoS performance of admitted data flows may be determined and may comprise delay performance, throughput performance, etc. Whether to admit or reject the new data flow may be determined based on the QoS performance of the admitted data flows.

In one design, the admitted data flows and the new data flow may comprise expedited-forwarding (EF) flows having delay bounds. The QoS performance of the admitted EF flows may be quantified by a measured sector delay, which may be determined based on actual delays of packets. In one design, a measured flow delay for each admitted EF flow may be determined based on delays of packets for that EF flow. The measured sector delay may then be determined based on the measured flow delays for all admitted EF flows. The new EF flow may be admitted if the measured sector delay is less than a delay threshold.

In another design, the admitted data flows and the new data flow may comprise assured-forwarding (AF) flows having average throughput requirements. The QoS performance of the admitted AF flows may be quantified by a total achieved throughput of these AF flows. A total residual throughput may be determined based on the total achieved throughput and the total required throughput of the admitted AF flows as well as a total achieved throughput of admitted best effort (BE) flows. The new AF flow may be admitted if the total residual throughput exceeds a required throughput of the new AF flow.

In one design, a total sector throughput may be determined based on the throughputs of the admitted data flows and the required throughput of the new data flow. The new data flow may be admitted if the total sector throughput is less than a sector throughput threshold. If the total sector throughput is greater than the sector throughput threshold, then the new data flow may be admitted or rejected based on the QoS performance of the admitted data flows.

Various aspects and features of the disclosure are described in further detail below.

BRIEF DESCRIPTION OF THE DRAWINGS

FIG. 7 shows a process for admission control based on delay performance.

FIG. 8 shows a process for admission control based on QoS performance.

DETAILED DESCRIPTION

The admission control techniques described herein may be used for various wireless communication networks such as CDMA, TDMA, FDMA, OFDMA, SC-FDMA and other networks. The terms "network" and "system" are often used interchangeably. A CDMA network may implement a radio technology such as cdma2000, Universal Terrestrial Radio Access (UTRA), etc. cdma2000 covers IS-2000, IS-95 and IS-856 standards. UTRA includes Wideband CDMA (W-CDMA) and other variants of CDMA. A TDMA network may implement a radio technology such as Global System for Mobile Communications (GSM). An OFDMA network may implement a radio technology such as Ultra Mobile Broadband (UMB), Evolved UTRA (E-UTRA), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

For clarity, certain aspects of the techniques are described below for a High Rate Packet Data (HRPD) network that implements IS-856. HRPD is also referred to as CDMA2000 1xEV-DO, 1xEV-DO, 1x-DO, and High Data Rate (HDR).

Figure 1:
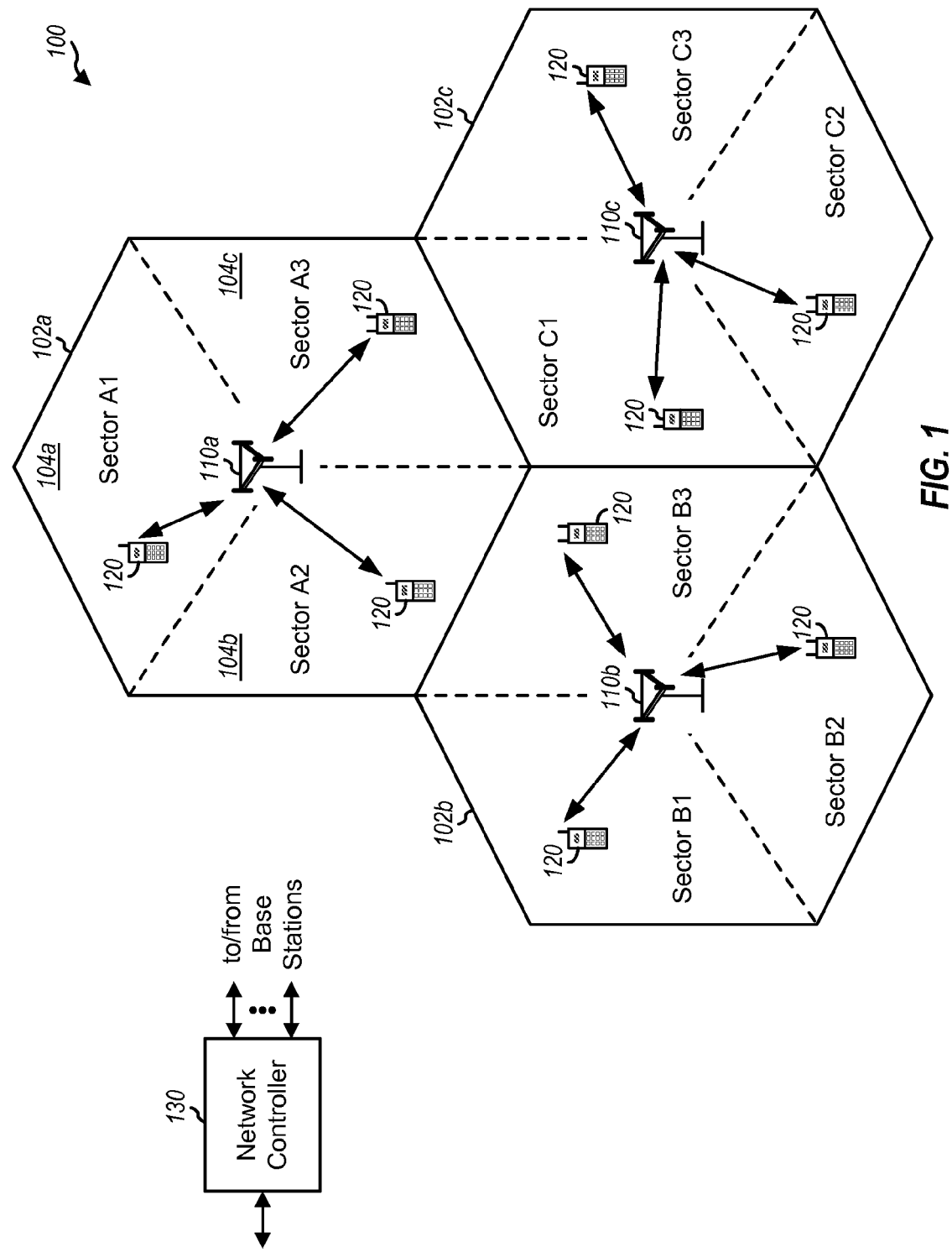
FIG. 1 shows a wireless communication network.

FIG. 1 shows a wireless communication network 100, which may be an HRPD network. Network 100 includes multiple base stations 110. A base station is a fixed station that communicates with the terminals and may also be referred to as a base transceiver station (BTS), an access point, a Node B, an evolved Node B (eNB), etc. Each base station 110 provides communication coverage for a particular geographic area 102 and supports communication for the terminals located within the coverage area. The coverage area of a base station may be partitioned into multiple smaller areas, e.g., three smaller areas 104a, 104b and 104c. Each smaller area may be served by a respective base station subsystem. In 3GPP2, the term "sector" can refer to the smallest coverage area of a base station and/or a base station subsystem serving this coverage area, depending on the context in which the term is used. In 3GPP, the term "cell" can refer to the smallest coverage area of a base station and/or a base station subsystem serving this coverage area. For clarity, the concept of sector in 3GPP2 is used in the description below. In the example shown in FIG. 1, base station 110a serves sectors A1, A2 and A3, base station 110b serves sectors B1, B2 and B3, and base station 110c serves sectors C1, C2 and C3.

A network controller 130 may couple to base stations 110 and provide coordination and control for these base stations. Network controller 130 may be a single network entity or a collection of network entities.

Terminals 120 may be dispersed throughout the network, and each terminal may be stationary or mobile. A terminal may also be referred to as a mobile station, a user equipment, an access terminal, a subscriber unit, a station, etc. A terminal may be a cellular phone, a personal digital assistant (PDA), a wireless communication device, a handheld device, a wireless modem, a laptop computer, etc. A terminal may communicate with a base station via the forward and reverse links. The forward link (or downlink) refers to the communication link from the base station to the terminal, and the reverse link (or uplink) refers to the communication link from the terminal to the base station. The terms "terminal" and "user" are used interchangeably herein.

A sector may communicate with one or more terminals via one or more data flows for each of the forward and reverse links. A data flow is a stream of data between two specific end points. A data flow may also be referred to as a flow, a packet flow, an Internet Protocol (IP) flow, a Radio Link Control (RLC) flow, a Radio Link Protocol (RLP) flow, etc. A terminal may have one or more data flows on each link for the communication with a sector. A new data flow may be added when needed (e.g., when an application is launched or a service is activated) and if resources are available at the sector. An existing data flow may be removed when no longer needed, and the resources used for that data flow may be made available to new data flows.

The network may support various types of data flows. Different types of data flows may be used for different traffic classes, different QoS classes, etc. Each data flow type may or may not be associated with QoS requirements. Table 1 lists some types of data flows and provides a short description for each data flow type.

TABLE 1

| Data Flow Type | Name | Description |
| --- | --- | --- |
| Expedited-Forwarding Data Flow | EF Flow | A data flow with delay bound. |
| Assured-Forwarding Data Flow | AF Flow | A data flow with average throughput requirement. |
| Best Effort Data Flow | BE Flow | A data flow with no delay bound or throughput requirement. |

In Table 1, QoS requirements are quantified by two QoS parameters—delay bound and average throughput. Average throughput may also be referred to as required throughput, required rate, etc. QoS requirements may also be quantified by other parameters such as peak throughput, packet error rate (PER), etc. A QoS flow is a data flow having at least one QoS requirement, e.g., delay bound and/or required throughput.

The EF flows and AF flows have QoS requirements and are two types of QoS flows. The BE flows have no QoS requirements and are non-QoS flows. An example of an EF flow is a Voice-over-IP (VoIP) flow. An example of an AF flow is a streaming video flow. An example of a BE flow is a data flow for data download. A scheduler may give the highest priority to EF flows, the next highest priority to AF flows, and the lowest priority to BE flows.

In general, a sector may support any number of EF flows, any number of AF flows, and any number of BE flows on each of the forward and reverse links. Once an EF flow or an AF flow is admitted on a given link, certain amount of resources may be made available to the flow in order to satisfy the QoS requirements of that flow. The amount of resources used by each data flow may vary due to various factors such as variations in the amount of data generated by a data source, variations in channel conditions, etc. The amount of data that can be reliably sent on a given amount of resources is dependent on the channel conditions. Hence, more resources are needed to send more data and/or for worse channel conditions. Since the available resources at the sector is limited, the number of EF flows and the number of AF flows to admit may be controlled in order to ensure good performance for the admitted flows.

In an aspect, admission control may be performed based on QoS performance of admitted data flows. Admission control may attempt to maximize the number of admitted QoS flows while ensuring that the QoS requirements of these QoS flows can be satisfied with high probability. This may improve utilization of the available resources as well as network capacity.

The performance of a given QoS flow may be quantified based on the QoS requirements of that flow. Different types of QoS flows may have different QoS requirements. For EF flows, the QoS requirements may comprise delay bounds for packets. Delay bound may also be referred to as delay requirement, maximum allowable delay, delay tolerance, delay limit, etc. The delay of a packet may be defined as the amount of time between the time the packet is received by the network and the time the packet is transmitted over the air. The delay of a packet may be set to a large value if the packet is dropped from a queue by a scheduler due to delay bound violation or if the packet is lost during transmission over the air.

For AF flows, the QoS requirements may comprise required throughputs. The throughput of an AF flow may be determined based on the amount of data sent in a given time interval. The throughput may be averaged or filtered over multiple time intervals to obtain an average throughput of the AF flow. The terms "throughput" and "rate" are used interchangeably herein.

In one design, the QoS performance of EF flows may be given by delay performance, which may be quantified based on two criteria—QoS satisfaction and QoS capacity. QoS satisfaction is applicable to each EF flow. An EF flow may be considered as achieving QoS satisfaction if a target percentage (e.g., 99%) of the packets for that EF flow have delays below a delay bound. QoS capacity is applicable to a sector. The QoS capacity of the sector may be defined by a target percentage or more (e.g., at least 95%) of the admitted EF flows achieving QoS satisfaction. New EF flows may be admitted or rejected based on the QoS performance of the admitted EF flows, as described below.

In one design, the QoS performance of AF flows may be given by throughput performance, which may be quantified based on a criterion of total residual throughput. The residual throughput of each AF flow may be computed as the difference between the achieved throughput and the required throughput of that AF flow. New AF flows may be admitted or rejected based on the total residual throughput for admitted AF and BE flows, as described below.

Figure 2:
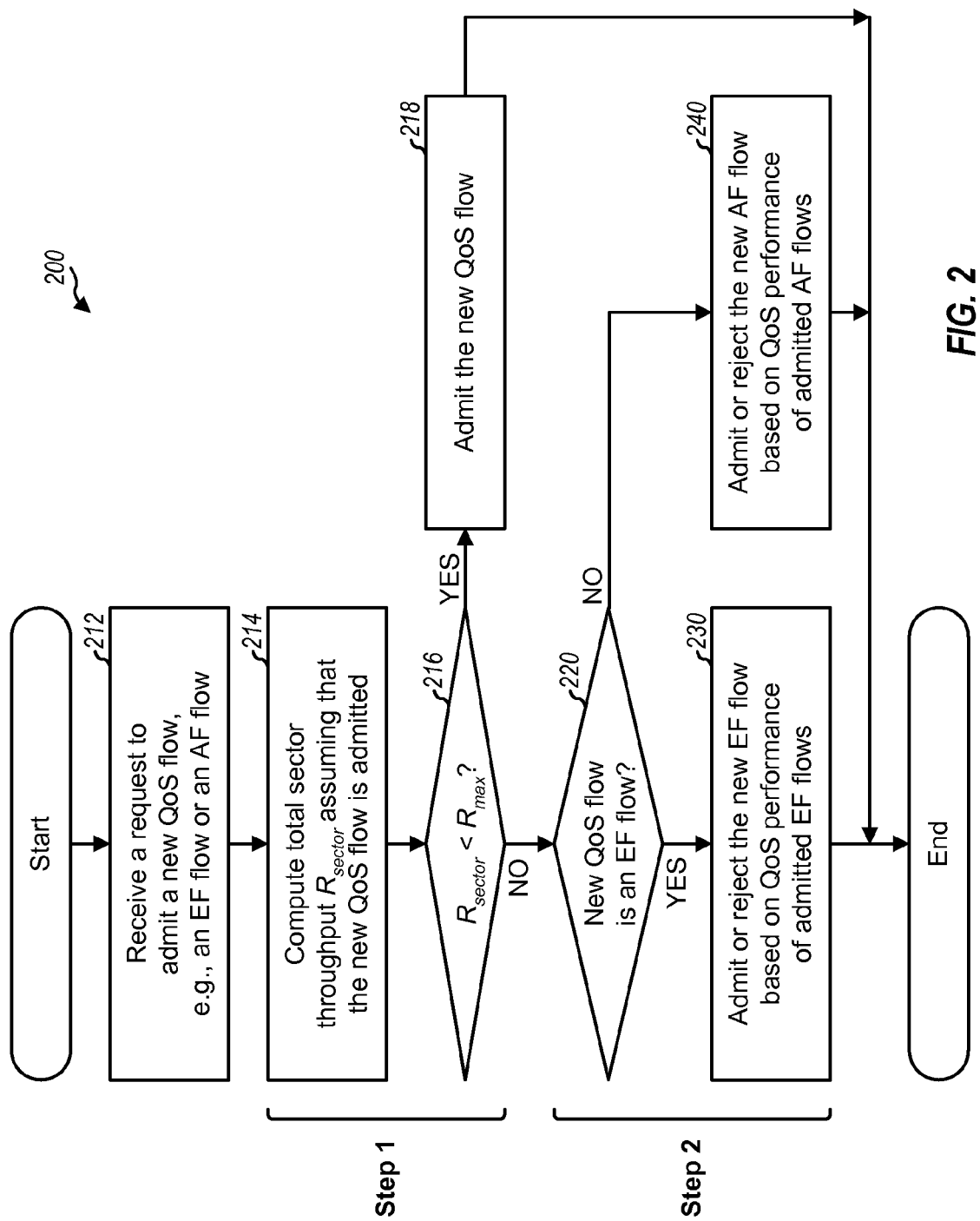
FIG. 2 shows a process for admission control based on QoS performance.

FIG. 2 shows a design of a process 200 for admission control based on QoS performance. Process 200 may be performed by a scheduler, which may reside within a base station or some other network entity. Process 200 may be used for admission control on the forward link, or the reverse link, or both links.

A request to admit a new QoS flow, which may be an EF flow or an AF flow, may be received (block 212). The total sector throughput assuming that the new QoS flow is admitted may be computed (block 214), as follows:

$$R_{sector} = R_{AF} + R_{BE} + \alpha \cdot R_{EF} + R_{new}, \quad \text{Eq (1)}$$

where $R_{AF}$ is the total throughput of all admitted AF flows in the sector, $R_{BE}$ is the total throughput of all admitted BE flows in the sector, $R_{EF}$ is the total throughput of all admitted EF flows in the sector, $R_{new}$ is the required throughput of the new QoS flow, $R_{sector}$ is the total sector throughput with the new QoS flow, and $\alpha > 1$ is a scaling factor for EF flows.

In equation (1), the scaling factor $\alpha$ accounts for the fact that an EF flow may require more resources than an AF flow for the same throughput due to the more stringent delay requirement of the EF flow. If the new QoS flow is an AF flow, then $R_{new}$ may be equal to the required throughput of the AF flow. If the new QoS flow is an EF flow, then $R_{new}$ may be equal to $\alpha$ times the expected or required throughput of the EF flow. $R_{AF}$, $R_{BE}$ and $R_{EF}$ may be obtained by accumulating the achieved throughputs of the individual AF, BE and EF flows, as follows:

$$R_{AF} = \sum_i R_{AF,i}, \quad R_{BE} = \sum_j R_{BE,j}, \quad R_{EF} = \sum_f R_{EF,f}, \quad \text{Eq (2)}$$

where $R_{AF,i}$, $R_{BE,j}$ and $R_{EF,f}$ are the achieved throughputs of the individual AF, BE and EF flows, respectively.

The total sector throughput $R_{sector}$ may be compared against a sector throughput threshold $R_{max}$ (block 216). $R_{max}$ may be dependent on various factors such as deployment scenario. $R_{max}$ may be specified for the sector and may be determined based on computer simulation, empirical measurement, etc. In any case, if $R_{sector}$ is less than $R_{max}$, then the new QoS flow may be admitted (block 218). Otherwise, a determination may be made whether the new QoS flow is an EF flow (block 220). If the new QoS flow is an EF flow, then the new EF flow may be admitted or rejected based on QoS performance of the admitted EF flows, as described below (block 230). Otherwise, if the new QoS flow is an AF flow, then the new AF flow may be admitted or rejected based on QoS performance of the admitted AF flows, as also described below (block 240).

Process 200 performs admission control using a two-step process. In step 1, the new QoS flow may be admitted if the total sector throughput is below the sector throughput threshold. Step 1 may admit or reject the new QoS flow based on a conservative estimate of sector capacity.

Figure 3:
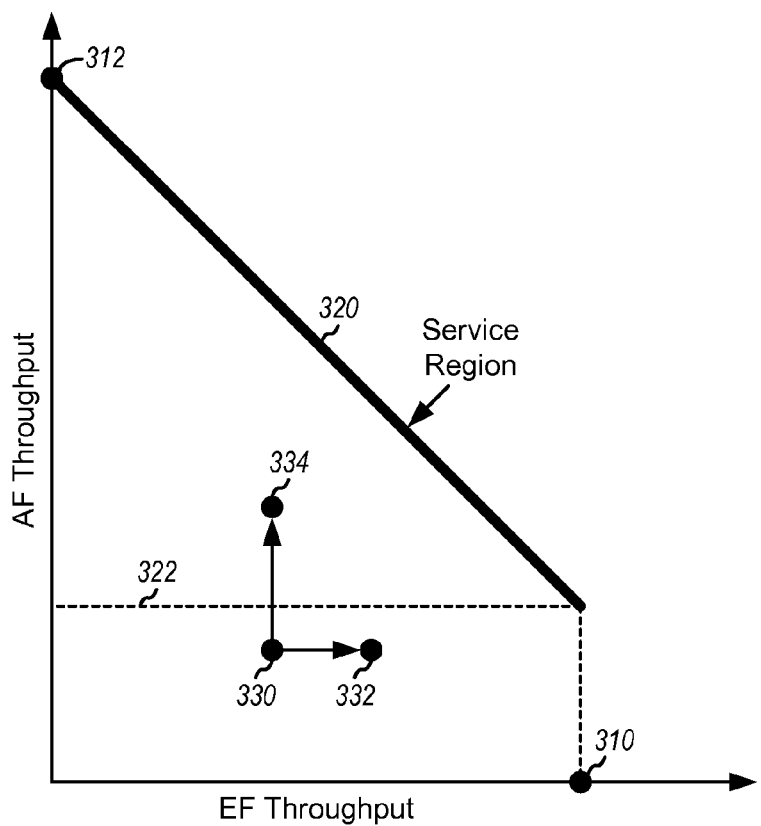
FIG. 3 shows a plot of admission control based on total sector throughput.

FIG. 3 shows a plot of admission control by step 1 in process 200. The horizontal axis represents the total throughput of EF flows, and the vertical axis represents the total throughput of AF flows. The sector capacity with only EF flows (or pure EF capacity) is given by a point 310. The sector capacity with only AF flows (or pure AF capacity) is given by a point 312. A solid line 320 represents a service region for the sector and has a slope of −1. Line 320 is determined by the sector throughput threshold $R_{max}$ and the scaling factor $\alpha$. A dashed line 322 represents the residual throughput at the EF capacity. When the EF flows reach capacity, there may still be non-zero residual capacity left for the AF and BE flows because EF capacity is defined by delay performance.

A point 330 represents the current operating point for the admitted EF and AF flows. Point 330 may be located anywhere within the service region. If the new QoS flow is an EF flow, then the new operating point would be at a point 332. Conversely, if the new QoS flow is an AF flow, then the new operating point would be at a point 334. The new QoS flow may be admitted if the new operating point is within the service region, i.e., below solid line 320.

Step 1 may be included in process 200 (as shown in FIG. 2) or may be omitted. In step 2 of process 200, the new QoS flow may be admitted or rejected based on QoS performance, which may be determined in different manners for EF flows and AF flows.

Figure 4:
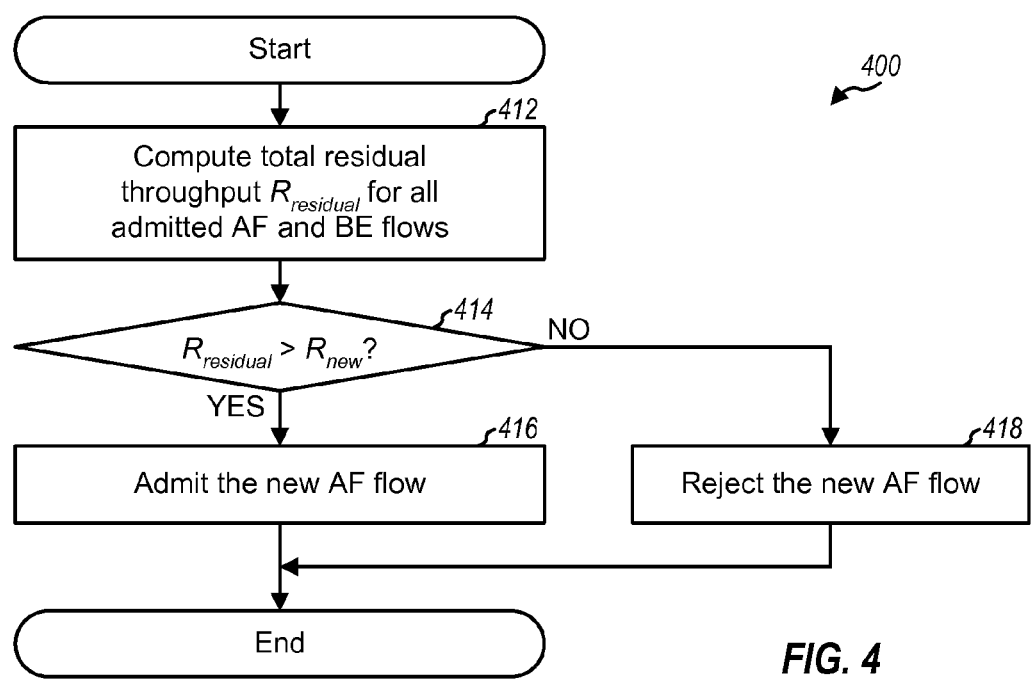
FIG. 4 shows a process for admission control based on throughput performance.

FIG. 4 shows a design of a process 400 for admission control for a new AF flow based on throughput performance. A total residual throughput $R_{residual}$ for all admitted AF and BE flows may be computed (block 412), as follows:

$$R_{residual} = R_{BE} + \sum_i (R_{req,i} - R_{AF,i}) = R_{BE} - R_{AF} + \sum_i R_{req,i}, \quad \text{Eq (3)}$$

where $R_{req,i}$ is the required throughput of AF flow i.

In the design shown in equation (3), all of the throughput of each BE flow may be considered as residual throughput and counted towards the total residual throughput. This is because the BE flows may be scheduled at a latter time if more resources are needed for the QoS flows. For each AF flow, the residual throughput is the difference between the achieved throughput and the required throughput of that AF flow. The residual throughput of an AF flow may be (i) positive if the achieved throughput is lower than the required throughput or (ii) negative otherwise.

A determination may be made whether the total residual throughput is greater than the required throughput $R_{new}$ of the new AF flow (block 414). If the answer is 'Yes', then the new AF flow may be admitted (block 416). Otherwise, the new AF flow may be rejected (block 418).

Process 400 may be used for admission control of AF flows. Process 400 may also be used for block 240 in FIG. 2.

The achieved throughput of an AF flow may be less than the required throughput for several reasons. First, channel conditions of a terminal with this AF flow may be too poor to support the required throughput. In this case, the residual throughput of this AF flow may be used for other AF flows. Second, the source of the AF flow may send less data than the required throughput. In this case, resources may be reserved for the AF flow in order to allow it to achieve its required throughput. The summations in equation (3) may thus include all or a subset of the admitted AF flows.

FIG. 4 shows one design of admitting or rejecting a new AF flow based on total residual throughput, which may be dependent on the residual throughputs of the admitted AF flows. A new AF flow may also be admitted or rejected based on QoS performance using other criteria instead of total residual throughput.

In one design of admission control for EF flows, the delays of packets for admitted EF flows may be ascertained and used to determine the delay performance of the admitted EF flows as well as to determine whether or not to admit new EF flows. Packet delays of the admitted EF flows may be used for admission control of new EF flows in various manners.

Figure 5:
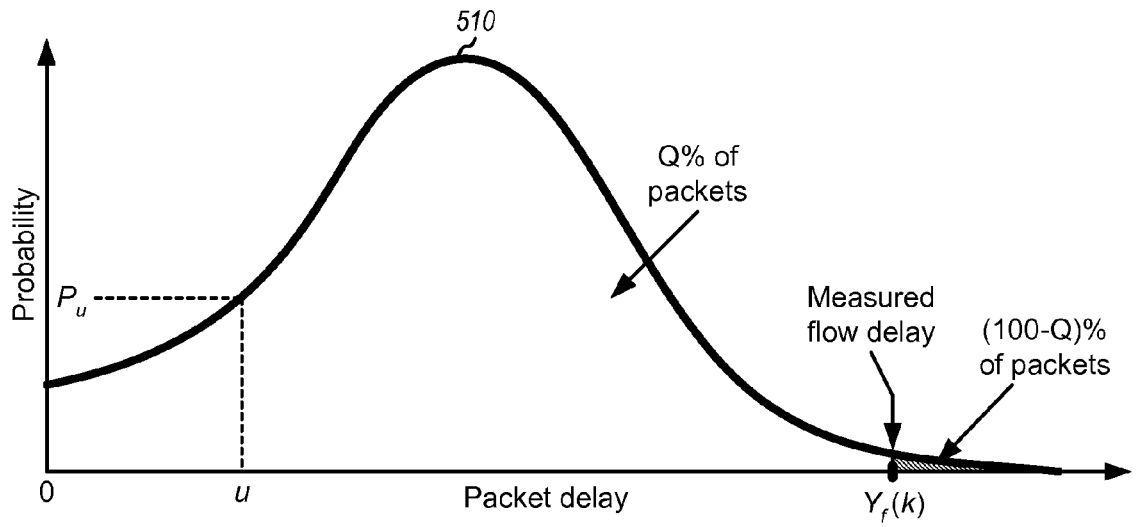
FIG. 5 shows a probability density function (PDF) of packet delay for one EF flow.

FIG. 5 shows a PDF of packet delay for one admitted EF flow. The horizontal axis represents packet delay and runs from zero toward infinity. Packet delay may be considered as a random variable having an exemplary PDF shown by a plot 510. This PDF provides the percentage or probability of packets with different delays. For example, $P_u$ percents of packets have delay of u. In general, the PDF may have any shape, which may be dependent on sector loading, scheduling of packets for the EF flow, channel conditions observed by the EF flow, etc. The PDF is shown in FIG. 5 for illustration only and may not be known by the scheduler.

In one design, the delay performance of an admitted EF flow may be quantified by a measured flow delay $Y_f(k)$. The measured flow delay may be defined such that Q percents of packets have delays better than $Y_f(k)$, and (100-Q) percents of packets have delays worse than $Y_f(k)$. The measured flow delay may also be referred to as the Q-percent delay tail, the Q-percentile delay, etc. The delay performance of the EF flow may be considered as satisfactory if Q percents of the packets for the EF flow have delays below the delay bound. Since 100% reliability is not needed for services such as VoIP, video, gaming, etc., Q may be set to a value less than 100. Q may be selected based on the desired quality and may be equal to 80, 90, 95, 99, or some other value.

In one design, the measured flow delay may be dynamically updated as follows:

$$Y_f(k) = \begin{cases} Y_f(k-1) + \Delta_{UP,f} & \text{if } X_f(k) > Y_f(k-1) \\ Y_f(k-1) - \Delta_{DN,f} & \text{if } X_f(k) \le Y_f(k-1), \end{cases} \quad \text{Eq (4)}$$

where $X_f(k)$ is the delay of the k-th packet for EF flow f,
$Y_f(k)$ is the measured flow delay for EF flow f after the k-th packet, and
$\Delta_{UP,f}$ is an up step and $\Delta_{DN,f}$ is a down step for EF flow f.

The packet delay $X_f(k)$ may be the actual delay of a packet if it is transmitted over the air or may be a large value if it is dropped from the queue due to delay bound violation. The up and down steps may be defined as follows:

$$\Delta_{DN,f} = \Delta_{UP,f} \cdot \left( \frac{100-Q}{Q} \right). \quad \text{Eq (5)}$$

$\Delta_{DN,f}$ may be a small fraction of $\Delta_{UP,f}$. For example, if Q=99%, then $\Delta_{DN,f}=\Delta_{UP,f}/99$. The value of $\Delta_{UP,f}$ may be selected based on a tradeoff between convergence rate and residual estimation error. A larger value of $\Delta_{UP,f}$ may provide faster convergence whereas a smaller value of $\Delta_{UP,f}$ may provide smaller residual estimation errors. $\Delta_{UP,f}$ may be equal to 1, 2, 3, 4, 5 or some other number of slots, where a slot has a duration of 1.667 milliseconds (ms) in HRPD.

In the design shown in equation (4), the measured flow delay of the EF flow may be dynamically updated whenever a packet is transmitted over the air or deleted from the queue for delay bound violation. If the delay of this packet is greater than the current measured flow delay $Y_f(k-1)$, then the measured flow delay is increased by the larger up step of $\Delta_{UP,f}$. Otherwise, if the delay of the packet is smaller than or equal to the current measured flow delay, then the measured flow delay is decreased by the smaller down step of $\Delta_{DN,f}$. The measured flow delay $Y_f(k)$ should converge to a point where Q percents of packets have better delays, and (100-Q) percents of packets have worse delays.

Figure 6:
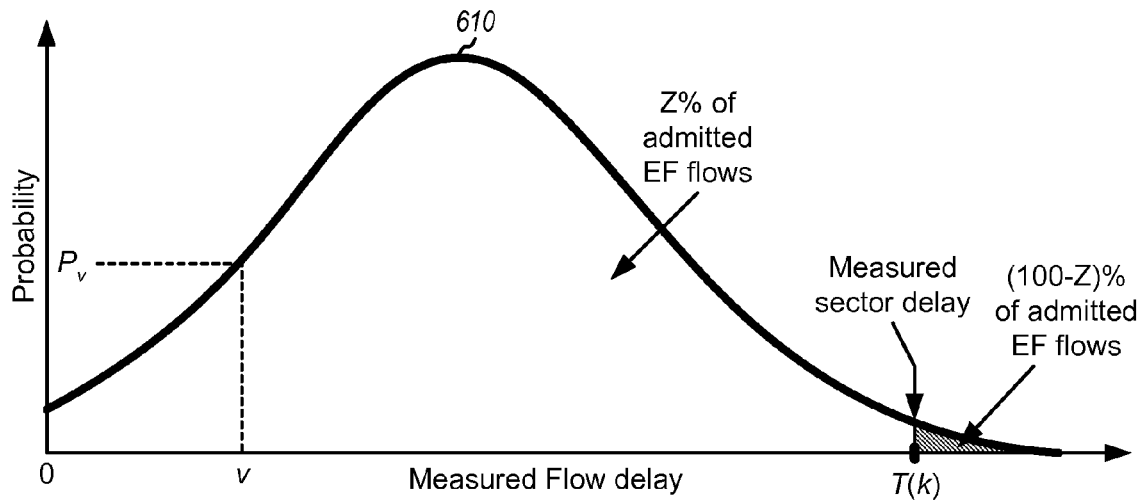
FIG. 6 shows a PDF of measured flow delay for all EF flows in one sector.

FIG. 6 shows a PDF of measured flow delay for all admitted EF flows in one sector. The horizontal axis represents measured flow delay and runs from zero toward infinity. Measured flow delay may be considered as a random variable having an exemplary PDF shown by a plot 610. This PDF provides the percentage or probability of admitted EF flows for different measured flow delays. For example, $P_v$ percents of admitted EF flows have measured flow delay of v. In general, the PDF may have any shape, which may be dependent on sector loading, scheduling of packets for the EF flows, channel conditions observed by the EF flows, etc. The PDF is shown in FIG. 6 for illustration only and may not be known by the scheduler.

In one design, the delay performance of all admitted EF flows in a sector may be quantified by a measured sector delay T(k). The measured sector delay may be defined such that Z percents of admitted EF flows have measured flow delays better than T(k), and (100-Z) percents of admitted EF flows have measured flow delays worse than T(k). Z may be equal to 80, 90, 95, 99 or some other value. The measured sector delay may also be referred to as the sector delay tail or some other term. The measured sector delay may be indicative of the amount of resources used for the admitted EF flows.

In one design, the measured sector delay may be dynamically updated as follows:

$$T(k) = \begin{cases} T(k-1) + \delta_{UP} & \text{if } Y_f(k) > T(k-1) \\ T(k-1) - \delta_{DN} & \text{if } Y_f(k) \le T(k-1), \end{cases} \quad \text{Eq (6)}$$

where $\delta_{UP}$ is an up step and $\delta_{DN}$ is a down step for the measured sector delay.

The up and down steps may be defined as follows:

$$\delta_{DN} = \delta_{UP} \cdot \left( \frac{100-Z}{Z} \right). \quad \text{Eq (7)}$$

$\delta_{DN}$ may be a small fraction of $\delta_{UP}$. For example, if Z=95%, then $\delta_{DN}=\delta_{UP}/19$. The value of $\delta_{UP}$ may be selected based on a tradeoff between convergence rate and residual estimation error. $\delta_{UP}$ may be equal to a predetermined value (e.g., 1, 3, 5, etc.) divided by the number of admitted EF flows.

In the design shown in equation (6), the measured sector delay may be dynamically updated whenever the measured flow delay for any admitted EF flows is updated. If the measured flow delay is greater than the current measured sector delay T(k−1), then the measured sector delay is increased by the larger up step of $\delta_{UP}$. Otherwise, if the measured flow delay is smaller than or equal to the current measured sector delay, then the measured sector delay is decreased by the smaller down step of $\delta_{DN}$. The measured sector delay T(k) should converge to a point where Z percents of all admitted EF flows have better measured flow delays, and (100−Z) percents of the admitted EF flows have worse measured flow delays. The measured sector delay is an estimate of the Z % tail delay based on the Q % percentile delays of all admitted EF flows and may thus be considered as a 'tail of the tail'.

In another design, the measured sector delay may be directly updated based on the packet delays, as follows:

$$T(k) = \begin{cases} T(k-1) + \delta_{UP} & \text{if } X_f(k) > T(k-1) \\ T(k-1) - \delta_{DN} & \text{if } X_f(k) \leq T(k-1). \end{cases} \quad \text{Eq (8)}$$

In the design shown in equation (8), the delay performance of all admitted EF flows in the sector is determined without computing the delay performance of the individual EF flows. The up and down steps may be selected based on the target percentage of packets with delays below the measured sector delay. The measured sector delay may also be determined in other manners.

The QoS performance of the admitted EF flows in the sector may be quantified by the measured sector delay, which may be updated as shown in equation (6) or (8). In one design, a new EF flow may be admitted based on the measured sector delay, as follows:

If $T(k) < T_{th}$, then admit the new EF flow,

Else reject the new EF flow, where $T_{th}$ is a delay threshold.

The delay threshold $T_{th}$ may be selected based on the desired probability of wrong admission as well as low probability of false alarm. A wrong admission occurs when a new EF flow is admitted because $T(k) < T_{th}$ but the actual sector delay with this EF flow admitted exceeds the delay bound, so that the new EF flow should have been rejected. A false alarm occurs when a new EF flow is rejected because $T(k) \geq T_{th}$ but the actual sector delay with this EF flow admitted is within the delay bound, so that the new EF flow should have been admitted. It may be desirable to keep the wrong admission probability under a target percentage (e.g., 5%) and to keep the false alarm probability as low as possible.

The delay threshold $T_{th}$ may be determined based on computer simulation, empirical measurement, field testing, etc. Computer simulation was performed to determine the delay threshold value and to evaluate the performance of admission control for EF flows based on delay performance, as described above. Multiple sets of simulations were performed for different numbers of EF flows. Each set included (i) a first round of simulations with n EF flows located throughout the sector and (ii) a second round of simulations with n+1 EF flows, where n is a different value for each set. For each set, the first round of simulations with n EF flows was initially performed, and the measured sector delay was obtained. For the second round, a new EF flow was admitted, and simulations with n+1 EF flows were performed. After completing the second round, the actual sector delay $T_{actual}$ was determined and compared against the delay bound to ascertain whether performance was acceptable for n+1 EF flows. The value of the delay threshold was selected such that the target wrong admission probability and low false alarm probability were obtained for the new EF flow added at the start of the second round. The value of the delay threshold may also be determined in other manners.

The description above assumes that the EF flows have the same delay bound and required throughput. In general, different EF flows may have different delay bounds and/or different required throughputs. In one design, each EF flow may be mapped to an equivalent number of base EF flows. A base EF flow may have a particular delay bound and a particular required throughput, which may be defined based on the delay bound and the required throughput of the most common type of EF flows, e.g., VoIP flows.

When a packet of an admitted EF flow is used to update the measured flow delay, the delay of the packet may be scaled as follows:

$$\tilde{X}_f(k) = X_f(k) \cdot \frac{B_{EF,f}}{B_{EF,base}}, \quad \text{Eq (9)}$$

where $B_{EF,f}$ is the delay bound of admitted EF flow f, $B_{EF,base}$ is the delay bound of the base EF flow, and $\tilde{X}_f(k)$ is a scaled packet delay for the k-th packet of EF flow f.

The measured flow delay may then be updated by the scaled packet delay, e.g., as shown in equation (4). Packets in the queue may be dropped if their delays exceed the delay bound of the admitted EF flow (and not the delay bound of the base EF flow).

For admission control, the value of the delay threshold may be selected based on the required throughput of the new EF flow. Different delay threshold values may be used for different required throughputs. In one design, the new EF flow may be mapped to an equivalent number of base EF flows, as follows:

$$N_{new} = \left\lceil \frac{R_{new}}{R_{EF,base}} \right\rceil, \quad \text{Eq (10)}$$

where $R_{new}$ is the required throughput of the new EF flow, $R_{EF,base}$ is the required throughput of the base EF flow, $N_{new}$ is the number of base EF flows for the new EF flow, and "⌈ ⌉" denotes a ceiling operator.

The value of the delay threshold may be selected based on the number of base EF flows, $N_{new}$. Table 2 shows an example set of delay threshold values for different numbers of base EF flows.

TABLE 2

| Number of new base EF flows $N_{new}$ | Delay Threshold $T_{th}$ | Number of admitted base EF flows |
|---|---|---|
| 1 | 65 | 54.7 |
| 2 | 62 | 53.6 |
| 3 | 58 | 51.5 |
| 4 | 54 | 49.1 |
| 5 | 52 | 47.8 |

TABLE 2-continued

| Number of new base EF flows $N_{new}$ | Delay Threshold $T_{th}$ | Number of admitted base EF flows |
|---|---|---|
| 6 | 50 | 46.6 |
| 7 | 48 | 45.3 |
| 8 | 45 | 43.7 |
| 9 | 44 | 43.1 |
| 10 | 43 | 42.6 |

In Table 2, the delay threshold values are given in units of slots. The delay threshold values are selected such that the wrong admission probability is 5% when the admitted EF flows are approximately equal to the supportable number of base EF flows, which are given in the third and sixth columns of Table 2. Table 2 also assumes a delay bound of 84 slots. As shown in Table 2, progressively smaller delay threshold values may be used for progressive more new base EF flows to admit. A new EF flow with a larger required throughput may utilize more resources, which may be available when the measured sector delay is smaller.

Some EF flows may be elastic, which means that whatever available capacity may be filed by the EF flows. If a new EF flow is to be admitted even though the measured sector delay exceeds the delay threshold, then the throughput performance of each admitted EF flow may be examined to determine whether part of the throughput which is higher than the minimum requirement can be used for the new EF flow.

Multiple new EF flows may desire admission at the same time. These new EF flows may be mapped to an equivalent total number of base EF flows. The value of the delay threshold may be selected based on the total number of base EF flows. Alternatively, the number of supportable new base EF flows may be determined based on the measured sector delay and the different delay threshold values for different numbers of new base EF flows. Zero or more new EF flows may then be admitted based on the number of supportable new base EF flows.

FIG. 7 shows a design of a process 700 for admission control for a new EF flow based on delay performance. A measured flow delay for each admitted EF flow may be updated based on the delays of packets for that EF flow, e.g., as shown in equation (4) (block 712). A measured sector delay for a sector may be updated based on the measured flow delays for all admitted EF flows in the sector, e.g., as shown in equation (6) (block 714). Alternatively, the measured sector delay may be updated directly based on the delays of all packets for all admitted EF flows, e.g., as shown in equation (8). Blocks 712 and 714 may be performed (i) whenever a packet is transmitted or deleted from a queue, (ii) in each update interval based on the delays of all packets transmitted and deleted in that update interval, or (iii) in some other manner.

A value of a delay threshold may be determined for the new EF flow, e.g., based on the required throughput of the new EF flow (block 716). A determination is then made whether the measured sector delay is less than the delay threshold (block 718). If the answer is 'Yes', then the new EF flow may be admitted (block 720). Otherwise, the new EF flow may be rejected (block 722).

Process 700 may be used for admission control of EF flows. Part of process 700, such as blocks 716 to 722, may also be used for block 230 in FIG. 2.

FIG. 8 shows a design of a process 800 for performing admission control based on QoS performance. Process 800 may be used for admission control on the forward link or the reverse link. A request for admission of a new data flow may be received (block 812). QoS performance of admitted data flows may be determined and may comprise delay performance, throughput performance, etc. (block 814). Whether to admit or reject the new data flow may be determined based on the QoS performance of the admitted data flows (block 816).

In one design, the admitted data flows and the new data flow may comprise EF flows having delay bounds. The QoS performance of the admitted data flows may comprise a measured sector delay, which may be determined based on delays of packets for the admitted data flows. In one design of block 814, a measured flow delay for each admitted data flow may be determined based on the delays of packets for that admitted data flow. The measured flow delay may be (i) increased by an up step if the delay of a packet exceeds the measured flow delay or (ii) decrease by a down step otherwise, e.g., as shown in equation (4). The up and down steps for each admitted data flow may be determined based on a target percentage of packets with delays less than the measured flow delay for that admitted data flow, e.g., as shown in equation (5). The delay of each packet may also be scaled based on the delay bound of its admitted data flow and a base delay bound, e.g., as shown in equation (9). The scaled delay may then be used to increase or decrease the measured flow delay.

The measured sector delay may be determined based on the measured flow delays for all admitted data flows. The measured sector delay may be (i) increased by an up step if a measured flow delay for an admitted data flow exceeds the measured sector delay or (ii) decreased by a down step otherwise, e.g., as shown in equation (6). The up and down steps may be determined based on a target percentage of admitted data flows with measured flow delays less than the measured sector delay, e.g., as shown in equation (7). In another design of block 814, the measured sector delay may be updated directly based on the delays of packets for the admitted data flows, e.g., as shown in equation (8).

In one design of block 816, the new data flow may be admitted if the measured sector delay is less than a delay threshold. A value for the delay threshold may be selected based on the required throughput of the new data flow.

In another design, the admitted data flows and the new data flow may comprise AF flows having throughput requirements. The QoS performance of the admitted data flows may comprise total achieved throughput. A total residual throughput may be determined based on the total achieved throughput and the total required throughput of the admitted AF flows as well as the total achieved throughput of admitted BE flows, e.g., as shown in equation (3). The new data flow may be admitted if the residual throughput exceeds the required throughput of the new data flow.

In one design, the total sector throughput may be determined based on the throughputs of the admitted data flows and the required throughput of the new data flow, e.g., as shown in equation (1). The new data flow may be admitted if the total sector throughput is less than a sector throughput threshold. Blocks 814 and 816 may be performed only if the total sector throughput is greater than the sector throughput threshold.

In another aspect, admission control for the reverse link in a CDMA network is performed by considering rise-over-thermal (RoT). For CDMA, multiple terminals may currently transmit on the reverse link to a sector, and the transmission from each terminal acts as interference to the transmissions from other terminals at the sector. The capacity of the CDMA network may thus be interference-limited on the reverse link. RoT is a ratio of total noise and interference to thermal noise at a sector. RoT is a fundamental measure of loading on the reverse link in the CDMA network.

In one design, the RoT of a sector may be estimated, e.g., as described in commonly assigned U.S. patent application Ser. No. 12/031,245, entitled "SCHEDULING BASED ON RISE-OVER-THERMAL IN A WIRELESS COMMUNICATION SYSTEM," filed Feb. 14, 2008. The contribution to RoT by QoS flows and the contribution to RoT by non-QoS flows may be estimated. The contribution to RoT by a given data flow may be estimated based on an energy-per-chip for pilot to total noise and interference ratio ($E_{cp}/N_t$) for a terminal transmitting the data flow and a traffic-to-pilot ratio (T2P) for the data flow, as described in the aforementioned patent application Ser. No. 12/031,245. The RoT contribution may also be estimated based on (i) a Reverse Activity Bit (RAB) in HRPD (ii) QoS throughput that may be estimated by the required throughput of the data flow, and/or (iii) some other information. The RAB bit is a broadcast bit that indicates whether the reverse link is loaded for a sector. The RAB bit may be set every slot by examining the reverse link loading. When the RAB bit for the sector is set to "busy", all terminals in the sector may reduce their data rate unless their QoS class requires a specific data rate. A decision to admit or reject a new QoS flow may be made by (i) comparing the elastic throughput and the required throughput of the new QoS flow and (ii) admitting the new QoS flow if its required throughput is lower than the elastic throughput.

Figure 9:
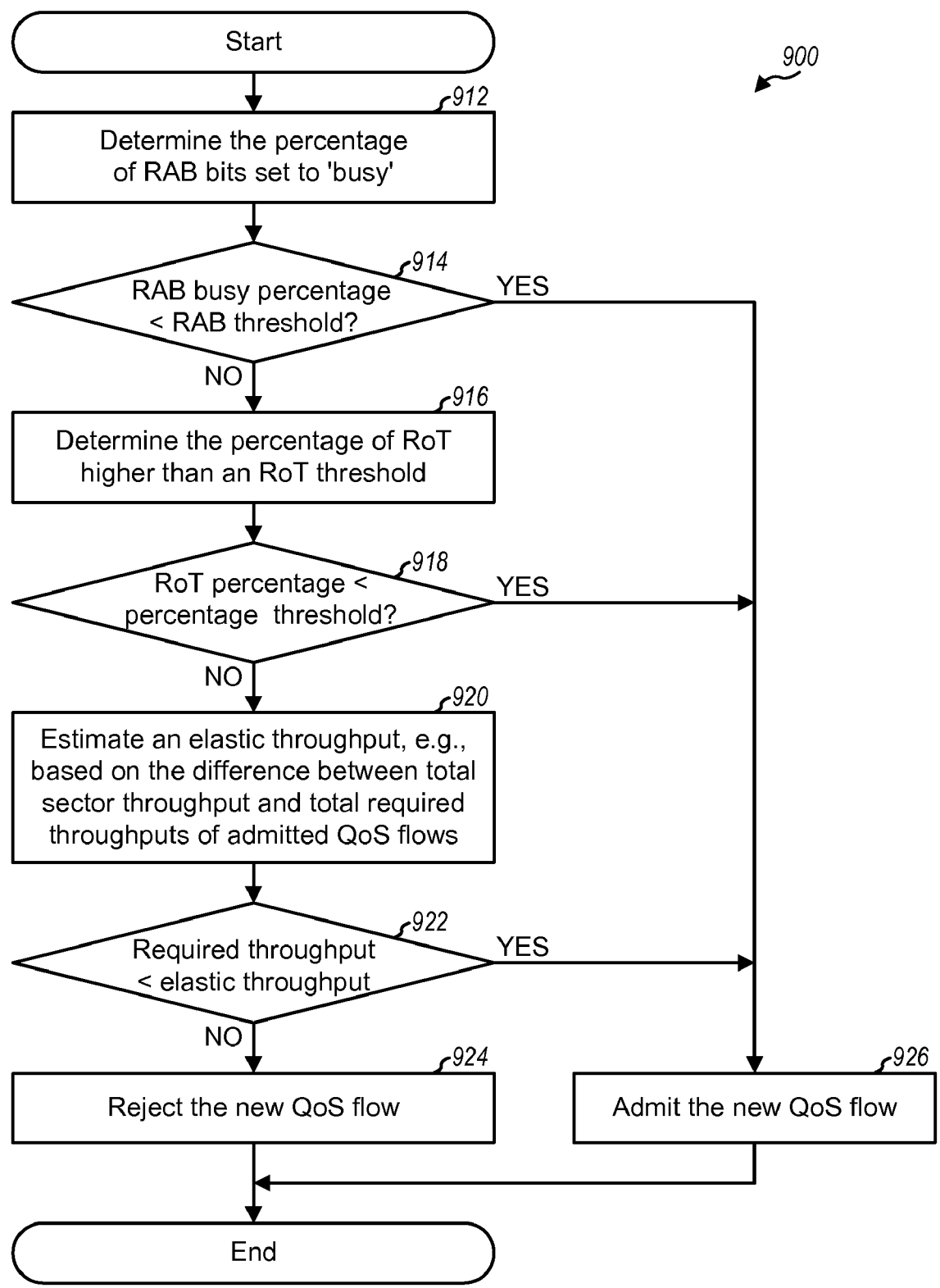
FIG. 9 shows a process for admission control for the reverse link.

FIG. 9 shows a design of a process 900 for admission control for the reverse link. Initially, the percentage of RAB bits that are set to 'busy' may be determined (step 912). If this RAB busy percentage is below an RAB threshold, as determined in block 914, then the sector may be considered as lightly loaded, and a new QoS flow may be admitted in the sector (block 926).

Otherwise, the percentage of RoT higher than an RoT threshold may be determined (block 916). If this RoT percentage is lower than a percentage threshold, as determined in block 918, then the new QoS flow may be admitted (block 926). Blocks 916 and 918 consider the tail of the RoT rather than the mean of the RoT. RoT and load may be closely related, and the QoS performance of an EF flow may be more dependent on the RoT tail than the mean RoT. Furthermore, the RoT tail may be more directly related to power limitation of terminals located at the sector edge. Alternatively, the RoT distribution may be approximated by a Gaussian distribution whose mean and standard deviation may be estimated from RoT measurements. The RoT tail may then be determined based on the mean and standard deviation of the Gaussian distribution.

If the answer is 'No' for block 918, then an elastic throughput may be estimated, e.g., based on the difference between the total sector throughput and the sum of the required throughputs of the admitted QoS flows (block 920). The total sector throughput may be determined based on (i) Reverse Rate Indicator (RRI) bits that indicate the rate of traffic channels sent on the reverse link, (ii) total received data at the sector for the admitted QoS flows, and/or (iii) some other information. If the required throughput of the new QoS flow is less than the elastic throughput, as determined in block 922, then the new QoS flow may be admitted (block 926). Otherwise, the new QoS flow may be rejected (block 924).

A terminal may have more than one sector in its active set, which may contain all sectors in communication with the terminal. Admission control may be performed by all sectors in the active set for a new QoS flow from the terminal. Admission control may be exempted if the new QoS flow adds a new sector into the active set since this QoS flow is already ongoing in the sector(s) already in the active set and should be accepted by the new sector in the active set.

The required throughput of a new EF flow may be multiplied by the scaling factor α since the EF flow has a shorter packet termination target, which may require more resources of the sector. In addition, if a sector is included in the active set but is not a serving sector, then the required throughput of the new EF flow may be scaled because the interference due to this new EF flow at the serving and non-serving sectors may be quite different.

For both the forward and reverse links, admission control may be performed for new data flows during connection setup. Admission control may be performed when a new data flow is added or when an existing data flow comes out of dormancy. Admission control may be exempted for incoming data flows due to handoff. The number of data flows leaving a sector typically matches the number of data flows entering the sector. Nevertheless, the sector may reserve some resources or margin to accommodate a burst of incoming data flows due to handoff.

A QoS flow may be removed or downgraded to a non-QoS flow if its performance is poor, e.g., due to poor channel conditions. In one design, an EF flow may be removed if the packet error rate is excessive, e.g., higher than a threshold. In one design, an AF flow may be downgraded to a BE flow if (i) its achieved throughput is low compared to the required throughput, (ii) the queue for the AF flow is not empty, and (iii) the average requested rate is greater than a threshold, which may indicate that the AF flow is using excessive resources. In one design, the downgraded AF flow may be upgraded back to AF status if its achieved throughput is consistently higher than requested rate and if the AF flow occupies only a small portion of the sector resources.

Admission control for data flows have been described above. In general, admission control may be performed for any quantity potentially having QoS requirements. For example, admission control may be performed for services, applications, users, terminals, etc. Thus, the term "data flow" in the description herein may generally refer to any quantity potentially having QoS requirements and for which admission control may be performed.

Figure 10:
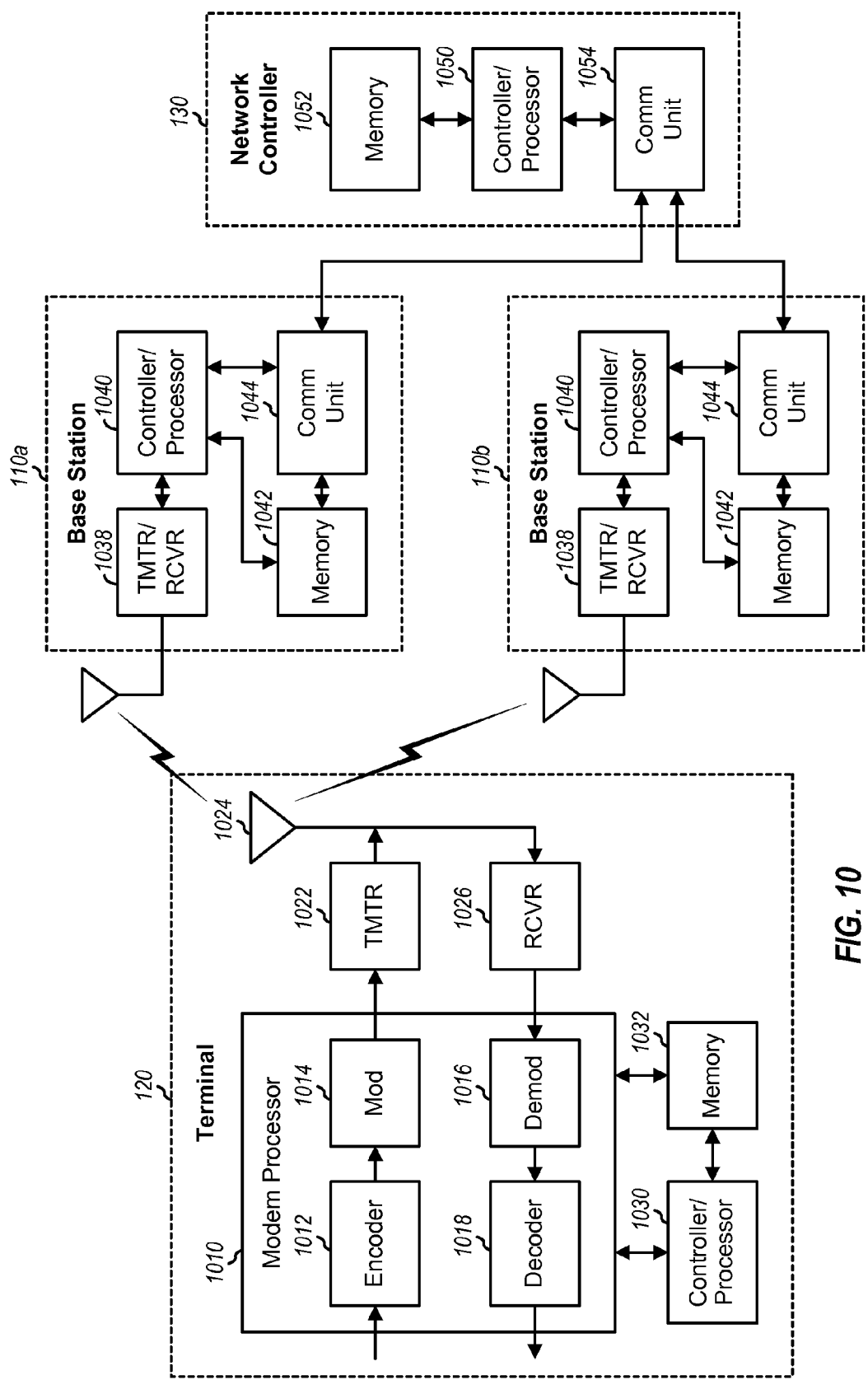
FIG. 10 shows a block diagram of a base station and a terminal.

FIG. 10 shows a block diagram of a design of terminal 120, which may be one of the terminals in FIG. 1. On the reverse link, an encoder 1012 may receive data for one or more data flows and signaling to be sent by terminal 120 on the reverse link. Encoder 1012 may process (e.g., format, encode, and interleave) the data and signaling. A modulator (Mod) 1014 may further process (e.g., modulate, channelize, and scramble) the encoded data and signaling and provide output chips. A transmitter (TMTR) 1022 may condition (e.g., convert to analog, filter, amplify, and frequency upconvert) the output chips and generate a reverse link signal, which may be transmitted via an antenna 1024 to one or more base stations.

On the forward link, antenna 1024 may receive forward link signals transmitted by one or more base stations. A receiver (RCVR) 1026 may condition (e.g., filter, amplify, frequency downconvert, and digitize) the received signal from antenna 1024 and provide samples. A demodulator (Demod) 1016 may process (e.g., descramble, channelize, and demodulate) the samples and provide symbol estimates. A decoder 1018 may further process (e.g., deinterleave and decode) the symbol estimates and provide decoded data and signaling sent to terminal 120. Encoder 1012, modulator 1014, demodulator 1016, and decoder 1018 may be implemented by a modem processor 1010. These units may perform processing in accordance with the radio technology (e.g., HRPD, WCDMA, etc.) used by the network. A controller/processor 1030 may direct the operation of various units at terminal 120. Memory 1032 may store program codes and data for terminal 120.

FIG. 10 also shows a block diagram of a design of base stations 110*a* and 110*b* in FIG. 1. Base station 110*a* may be a serving sector for terminal 120, and base station 110*b* may be a neighbor sector or an active set sector for terminal 120. At each base station 110, a transmitter/receiver 1038 may support radio communication with terminal 120 and other terminals. A controller/processor 1040 may perform various functions for communication with the terminals. For the reverse link, the reverse link signal from terminal 120 may be received and conditioned by receiver 1038 and further processed by controller/processor 1040 to recover the data and signaling sent by the terminal. For the forward link, data for one or more data flows and signaling may be processed by controller/processor 1040 and conditioned by transmitter 1038 to generate a forward link signal, which may be transmitted to the terminals. Memory 1042 may store program codes and data for the base station. A communication (Comm) unit 1044 may support communication with network controller 130.

FIG. 10 also shows a block diagram of a design of network controller 130. At network controller 130, a controller/processor 1050 may perform various functions to support communication services for the terminals. Memory 1052 may store program codes and data for network controller 130. A communication unit 1054 may support communication with base stations 110.

Admission control may be performed by base stations 110, network controller 130, or some other entity. Controller/processor 1040 or 1050 may perform or direct process 200 in FIG. 2, process 400 in FIG. 4, process 700 in FIG. 7, process 800 in FIG. 8, process 900 in FIG. 9, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of performing admission control in a wireless communication network, comprising:

determining quality of service (QoS) performance of admitted data flows;

determining whether to admit or reject a new data flow based on the QoS performance of the admitted data flows, determining total sector throughput based on throughputs of the admitted data flows and a required throughput of the new data flow;

admitting the new data flow if the total sector throughput is less than a sector throughput threshold; and performing the determining the QoS performance and the determining whether to admit or reject the new data flow, if the total sector throughput is greater than the sector throughput threshold.

2. The method of claim 1, wherein the determining the QoS performance of the admitted data flows comprises determining delay performance or throughput performance of the admitted data flows, and wherein the determining whether to admit or reject the new data flow comprises determining whether to admit or reject the new data flow based on the delay performance or the throughput performance of the admitted data flows.

3. The method of claim 1, wherein the determining the QoS performance of the admitted data flows comprises determining a measured sector delay based on delays of packets in the admitted data flows, and wherein the determining whether to admit or reject the new data flow comprises admitting the new data flow if the measured sector delay is less than a delay threshold.

4. The method of claim 3, wherein the determining the measured sector delay comprises
determining a measured flow delay for each admitted data flow based on delays of packets in the admitted data flow, and
determining the measured sector delay based on measured flow delays for the admitted data flows.

5. The method of claim 4, wherein the measured flow delay for each admitted data flow is determined based further on a target percentage of packets with delays less than the measured flow delay, and wherein the measured sector delay is determined based further on a target percentage of admitted data flows with measured flow delays less than the measured sector delay.

6. The method of claim 4, wherein the determining the measured flow delay for each admitted data flow comprises
increasing the measured flow delay by an up step if the delay of a packet in the admitted data flow exceeds the measured flow delay, and
decreasing the measured flow delay by a down step if the delay of the packet is equal to or less than the measured flow delay.

7. The method of claim 6, wherein the up and down steps for each admitted data flow are determined based on a target percentage of packets with delays less than the measured flow delay for the admitted data flow.

8. The method of claim 6, wherein the determining the measured flow delay for each admitted data flow further comprises
scaling the delay of the packet based on a delay bound of the admitted data flow and a base delay bound, and
increasing or decreasing the measured flow delay for the admitted data flow based on the scaled delay of the packet.

9. The method of claim 4, wherein the determining the measured sector delay comprises
increasing the measured sector delay by an up step if a measured flow delay for an admitted data flow exceeds the measured sector delay, and
decreasing the measured sector delay by a down step if the measured flow delay for the admitted data flow is equal to or less than the measured sector delay.

10. The method of claim 9, wherein the up and down steps are determined based on a target percentage of admitted data flows with measured flow delays less than the measured sector delay.

11. The method of claim 3, wherein the determining whether to admit or reject the new data flow further comprises selecting a value for the delay threshold based on a required throughput of the new data flow.

12. The method of claim 1, wherein the determining the QoS performance of the admitted data flows comprises determining total achieved throughput of the admitted data flows, and wherein the determining whether to admit or reject the new data flow comprises
determining a total residual throughput based on the total achieved throughput and total required throughput of the admitted data flows, and
admitting the new data flow if the total residual throughput exceeds a required throughput of the new data flow.

13. The method of claim 12, wherein the total residual throughput is determined based further on total achieved throughput of admitted best effort flows.

14. The method of claim 1, wherein the admitted data flows comprise expedited-forwarding (EF) flows having delay bounds, assured-forwarding (AF) flows having throughput requirements, and best effort (BE) flows, and wherein the determining the total sector throughput comprises
determining total throughput of the AF flows,
determining total throughput of the EF flows,
scaling the total throughput of the EF flows by a scaling factor,
determining total throughput of the BE flows, and
determining the total sector throughput based on the total throughput of the AF flows, the scaled total throughput of the EF flows, the total throughput of the BE flows, and the required throughput of the new data flow.

15. An apparatus for wireless communication, comprising:
at least one processor configured to determine quality of service (QoS) performance of admitted data flows, and to determine whether to admit or reject a new data flow based on the QoS performance of the admitted data flows,
wherein the at least one processor is configured to determine total sector throughput based on throughputs of the admitted data flows and a required throughput of the new data flow, to admit the new data flow if the total sector throughput is less than a sector throughput threshold, and to determine the QoS performance and whether to admit or reject the new data flow, if the total sector throughput is greater than the sector throughput threshold.

16. The apparatus of claim 15, wherein the at least one processor is configured to determine a measured flow delay for each admitted data flow based on delays of packets in the admitted data flow, to determine a measured sector delay based on measured flow delays for the admitted data flows, and to admit the new data flow if the measured sector delay is less than a delay threshold.

17. The apparatus of claim 16, wherein the at least one processor is configured to increase a measured flow delay for an admitted data flow by an up step if the delay of a packet in the admitted data flow exceeds the measured flow delay, and to decrease the measured flow delay by a down step if the delay of the packet is equal to or less than the measured flow delay.

18. The apparatus of claim 16, wherein the at least one processor is configured to increase the measured sector delay by an up step if a measured flow delay for an admitted data flow exceeds the measured sector delay, and to decrease the measured sector delay by a down step if the measured flow delay for the admitted data flow is equal to or less than the measured sector delay.

19. The apparatus of claim 15, wherein the at least one processor is configured to determine total achieved throughput of the admitted data flows, to determine a total residual throughput based on the total achieved throughput and total required throughput of the admitted data flows, and to admit the new data flow if the total residual throughput exceeds a required throughput of the new data flow.

20. An apparatus for performing admission control in a wireless communication network, comprising:
    means for determining quality of service (QoS) performance of admitted data flows;
    means for determining whether to admit or reject a new data flow based on the QoS performance of the admitted data flows,
    means for determining total sector throughput based on throughputs of the admitted data flows and a required throughput of the new data flow;
    means for admitting the new data flow if the total sector throughput is less than a sector throughput threshold; and
    means for performing the determining the QoS performance and the determining whether to admit or reject the new data flow, if the total sector throughput is greater than the sector throughput threshold.

21. The apparatus of claim 20, wherein the means for determining the QoS performance of the admitted data flows comprises
    means for determining a measured flow delay for each admitted data flow based on delays of packets in the admitted data flow, and
    means for determining a measured sector delay based on measured flow delays for the admitted data flows, and wherein the means for determining whether to admit or reject the new data flow comprises means for admitting the new data flow if the measured sector delay is less than a delay threshold.

22. The apparatus of claim 21, wherein the means for determining the measured flow delay for each admitted data flow comprises
    means for increasing the measured flow delay by an up step if the delay of a packet in the admitted data flow exceeds the measured flow delay, and
    means for decreasing the measured flow delay by a down step if the delay of the packet is equal to or less than the measured flow delay.

23. The apparatus of claim 21, wherein the means for determining the measured sector delay comprises
    means for increasing the measured sector delay by an up step if a measured flow delay for an admitted data flow exceeds the measured sector delay, and
    means for decreasing the measured sector delay by a down step if the measured flow delay for the admitted data flow is equal to or less than the measured sector delay.

24. The apparatus of claim 20, wherein the means for determining the QoS performance of the admitted data flows comprises means for determining total achieved throughput of the admitted data flows, and wherein the means for determining whether to admit or reject the new data flow comprises
    means for determining a total residual throughput based on the total achieved throughput and total required throughput of the admitted data flows, and
    means for admitting the new data flow if the total residual throughput exceeds a required throughput of the new data flow.

25. A computer program product, comprising:
    a non-transitory computer-readable medium comprising:
        code for causing at least one computer to determine quality of service (QoS) performance of admitted data flows,
        code for causing the at least one computer to determine whether to admit or reject a new data flow based on the QoS performance of the admitted data flows,
        code for determining total sector throughput based on throughputs of the admitted data flows and a required throughput of the new data flow;
        code for admitting the new data flow if the total sector throughput is less than a sector throughput threshold; and
        code for performing the determining the QoS performance and the determining whether to admit or reject the new data flow, if the total sector throughput is greater than the sector throughput threshold.

26. The computer program product of claim 25, the computer-readable medium further comprising:
    code for causing the at least one computer to determine a measured flow delay for each admitted data flow based on delays of packets in the admitted data flow,
    code for causing the at least one computer to determine a measured sector delay based on measured flow delays for the admitted data flows, and
    code for causing the at least one computer to admit the new data flow if the measured sector delay is less than a delay threshold.

27. The computer program product of claim 25, the computer-readable medium further comprising:
    code for causing the at least one computer to determine total achieved throughput of the admitted data flows,
    code for causing the at least one computer to determine a total residual throughput based on the total achieved throughput and total required throughput of the admitted data flows, and
    code for causing the at least one computer to admit the new data flow if the total residual throughput exceeds a required throughput of the new data flow.

* * * * *